(12) United States Patent
Schmitz

(10) Patent No.: US 10,778,101 B1
(45) Date of Patent: Sep. 15, 2020

(54) SWITCHING REGULATOR CONTROLLER CONFIGURATION PARAMETER OPTIMIZATION

(71) Applicant: Alpha and Omega Semiconductor (Cayman) Ltd., Grand Cayman (KY)

(72) Inventor: Richard Schmitz, San Tan Valley, AZ (US)

(73) Assignee: ALPHA AND OMEGA SEMICONDUCTOR (CAYMAN) LTD., Grand Cayman (KY)

(*) Notice: Subject to any disclaimer, the term of this patent is extended or adjusted under 35 U.S.C. 154(b) by 14 days.

(21) Appl. No.: 16/352,129

(22) Filed: Mar. 13, 2019

(51) Int. Cl.
*H02M 3/158* (2006.01)
*H02M 3/157* (2006.01)

(52) U.S. Cl.
CPC .......... *H02M 3/1584* (2013.01); *H02M 3/157* (2013.01); *H02M 2003/1586* (2013.01)

(58) Field of Classification Search
CPC ...... H02M 3/155; H02M 3/157; H02M 3/158; H02M 3/1584; H02M 2001/0012; G05F 1/56; G05F 1/00; G05F 1/40
See application file for complete search history.

(56) References Cited

U.S. PATENT DOCUMENTS

| | | | | |
|---|---|---|---|---|
| 6,362,608 B1* | 3/2002 | Ashburn | ............. | H02M 3/1584 323/272 |
| 8,330,438 B2* | 12/2012 | Sreenivas | ........... | H02M 3/1584 323/272 |
| 10,250,122 B2* | 4/2019 | Chen | ..................... | H02M 3/156 |
| 2010/0225288 A1* | 9/2010 | Chen | ................... | H02M 3/1584 323/282 |
| 2014/0292291 A1* | 10/2014 | Lee | ..................... | H02M 3/1584 323/271 |
| 2015/0002126 A1* | 1/2015 | Ouyang | .............. | H02M 3/1584 323/304 |
| 2016/0233766 A1* | 8/2016 | Todorov | .............. | H02M 3/1584 |
| 2018/0191333 A1* | 7/2018 | Chen | ................... | H02M 3/156 |
| 2018/0337599 A1* | 11/2018 | Chen | ................... | H02M 3/158 |

* cited by examiner

*Primary Examiner* — Thienvu V Tran
*Assistant Examiner* — Nusrat Quddus
(74) *Attorney, Agent, or Firm* — Patent Law Works LLP

(57) ABSTRACT

A controller for a multi-phase switching regulator includes an error amplifier configured to generate an error signal indicative of the difference between a feedback voltage and a reference voltage; a loop calculator configured to generate control signals in response to the error signal to drive the power stages; and a dynamic phase management control circuit configured to generate a power efficiency value in response to the input current, the input voltage, the output current, and the output voltage. The dynamic phase management control circuit generates a phase selection signal indicating a first number of power stages to be activated in response to the first current signal and the power efficiency value. The phase selection signal is provided to the loop calculator to activate the first number of power stages.

15 Claims, 5 Drawing Sheets

US 10,778,101 B1

SWITCHING REGULATOR CONTROLLER CONFIGURATION PARAMETER OPTIMIZATION

BACKGROUND OF THE INVENTION

Switch mode power supplies or switching regulators, also referred to as DC to DC converters, are used to convert an input supply voltage to a desired output voltage at a voltage level appropriate for integrated circuits in an electronic system. For example, a 12 volts supply voltage provided to an electronic system may need to be reduced to 5 volts for supplying the I/O interface circuits and reduced to 1 V for supplying the core digital logic circuits. A switching regulator provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

The operation of the conventional switching regulator is well known and is generalized as follows. A switching regulator includes a pair of power switches which are turned on and off to regulate an output voltage in relation to a reference voltage. More specifically, the power switches are alternately turned on and off to generate a switching output voltage at a switching output node, also referred to as the switch node. The switch node is coupled to an LC filter circuit including an output inductor and an output capacitor to generate an output voltage having substantially constant magnitude. The output voltage can then be used to drive a load. Switching regulators include a control circuit which typically uses an error amplifier to compare a feedback voltage indicative of the output voltage with a reference voltage and the control circuit generates one or more control signals that control the switching frequency (pulse frequency modulation) or the pulse width (pulse width modulation) of the on-off switching cycle. Many different control schemes have been applied to control the duty cycle (i.e., the on-time) of the power switches.

Multi-phase switching regulators and multi-phase converters are known in the art. A multi-phase converter consists of paralleled power stages which drive a common load. The switching signals for each of the power stages are out of phase with each other. For example, one power stage might be opening a switch while another is closing a switch. Each power stage continues to operate on the same clock frequency. A multi-phase controller is typically used to control the multiple power stages in multi-phase operation. Multi-phase switching regulators realize many benefits including higher efficiency, faster transient response and higher current capability.

FIG. 1 is a schematic diagram of a conventional multi-phase switching regulator. Referring to FIG. 1, a multi-phase switching regulator 10 includes a multi-phase controller 12 driving N parallel power stages 22. Each power stage 22 is coupled to a respective output inductor L1 to LN. The output nodes of the output inductors L1 to LN are coupled to an output capacitor Cout to form the LC filter circuit to generate the regulated output voltage Vout (node 24) having a substantially constant magnitude. The output voltage Vout can then be used to drive a load 30 whereby switching regulator 10 provides the load current Load to maintain the output voltage Vout at a constant level. In some examples, the power stage 22 is implemented as a pair of power switches connected in series between an input voltage Vin and ground. The power switches can be N-type MOSFET devices or P-type and N-type MOSFET devices.

The multi-phase controller 12 implements feedback control of the power stages 22 to regulate the energy transfer to the LC filter circuit to maintain a constant output voltage within the desired load limits of the circuit. In particular, the multi-phase controller 12 receives a feedback voltage Vfb on a feedback node 26. The feedback voltage Vfb can be the regulated output voltage Vout or a divided down voltage of the regulated output voltage Vout. The multi-phase controller 12 generates the control signals, such as pulse-width-modulation (PWM) control signals PWM1 to PWMN, to cause the power switches in each power stage to turn on and off to regulate the output voltage Vout in relation to a reference voltage Vref. For example, the multi-phase controller 12 can include an error amplifier, a proportional-integral-derivative (PID) calculator, and a digital pulse-width-modulation (PWM) generator to generate the PWM control signals (node 19) for driving the respective power stage 22. Multi-phase controller 12 includes a memory 20 storing pre-set configuration parameters used in controlling the operation point of the switching regulator and the feedback control of the power stages 22.

Furthermore, the multi-phase controller 12 operates to select the number of phases, or the number of power stages, to activate in response to the load current demand. For example, the multi-phase controller 12 may implement dynamic phase management whereby a selected number of phases, or power stages, is activated based on the load current demand and using pre-set phase current thresholds. To that end, the controller 12 receives a sense current Isens (node 27) indicative of the load current $I_{Load}$ supplied to the load 30. The pre-set phase current thresholds and other configuration parameters for the feedback control operation may be stored in the memory 20. In some examples, the multi-phase controller 12 may be configured to control 5, 6 or 8 power stages. Each power stage has an associated maximum current limit (e.g. 60 A) being the maximum current that can be handled by the output inductor associated with the power stage. The controller activates a given number of power stages to distribute the load current demand over one or more power stages so that each power stage operates within its own current limit. Under conventional dynamic phase management schemes, the multi-phase controller 12 is configured with a set of pre-set phase current thresholds for selecting different combination of phases in response to the load current demand. For example, for load current values lower than a first phase current threshold, the controller 12 activates one power stage; for load current values equal to or greater than the first phase current threshold but lower than a second phase current threshold, the controller 12 activates two power stages, and so on.

In one example, assuming each power stage 22 in switching regulator 10 has a maximum current limit of 60 A. The controller 12 is configured with pre-set phase current thresholds of up to 40 A for one power stage, up to 80 A for two power stages and up to 120 A for three power stages, and so on. During operation, when the load current demand is less than 40 A, only one power stage is activated. When the load current demand increases to or exceeds 40 A, the first phase current threshold is reached and two power stages are activated. In the case the load current demand increases to 80 A or higher, the second phase current threshold is reached and three power stages are activated. In this manner, the controller 12 selectively turns on different number of power stages based on load current demand.

BRIEF DESCRIPTION OF THE DRAWINGS

Various embodiments of the invention are disclosed in the following detailed description and the accompanying drawings.

DETAILED DESCRIPTION

According to embodiments of the present disclosure, a controller for a multi-phase switching regulator implements configuration parameter optimization by measuring power efficiency to set the phase current thresholds for selecting the number of power stages to activate in operation. The phase current thresholds are set within the maximum current limit of the combination of power stages. More specifically, instead of using fixed pre-set phase current thresholds, the controller of the present invention set the phase current thresholds for different combinations of power stages dynamically by measuring the input and output power during run-time. The controller of the present invention is capable of optimizing energy usage by maximizing the power efficiency, the ratio of output power to input power, for a given operating point or for the overall operation of the multi-phase switching regulator.

More specifically, the switching regulator controller realizes many advantages over conventional solutions. First, the controller implements an autonomous and host-system independent control scheme for energy optimization. Using the controller, the phase current thresholds for selecting the number of phases, or power stages, to use for a specific load current value are set within the maximum current limits of the power stages to optimize the energy usage. No external system interaction or user input is required. Second, the controller operates to update the phase current threshold settings during runtime. Therefore, the operation of the multi-phase switching regulator can be optimized to obtain the best energy usage during runtime operation. In particular, the controller sets the phase current thresholds to obtain maximum power efficiency, that is, the ratio of output power to input power during runtime and autonomously.

Figure 1:
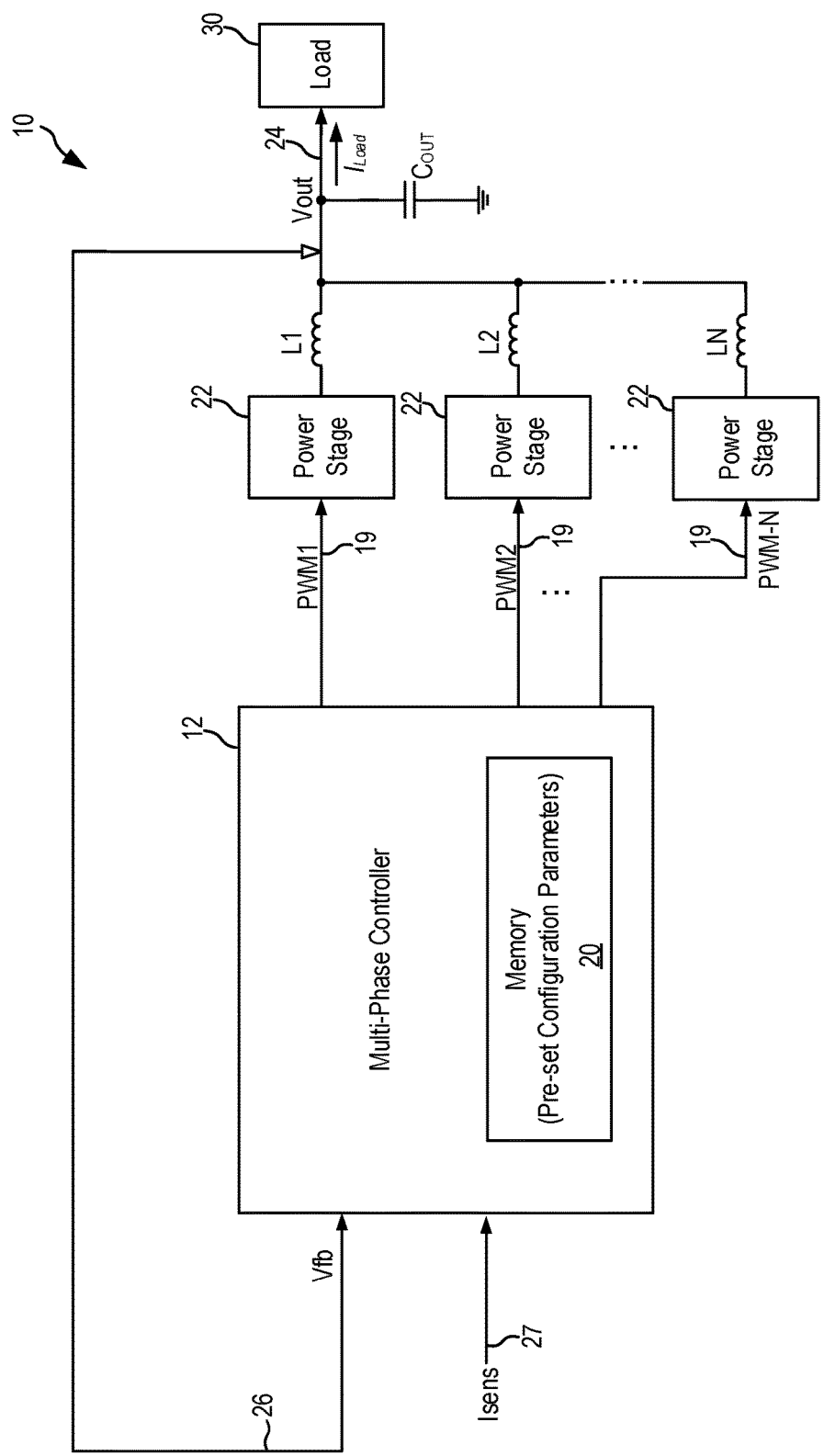
FIG. 1 is a schematic diagram of a conventional multi-phase switching regulator.
Figure 2:
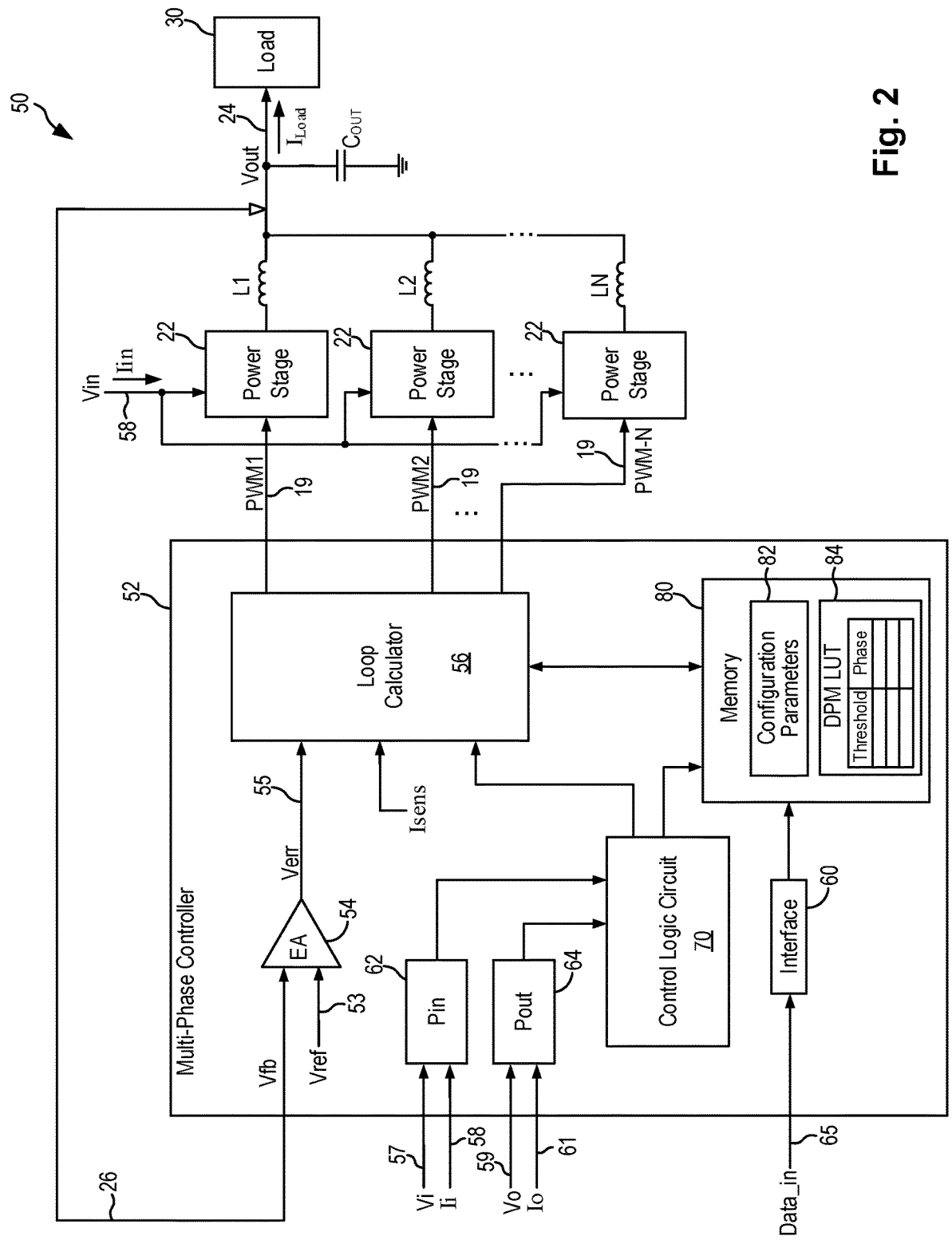
FIG. 2 is a schematic diagram of a multi-phase switching regulator incorporating a multi-phase controller in embodiments of the present invention.

FIG. 2 is a schematic diagram of a multi-phase switching regulator incorporating a multi-phase controller in embodiments of the present invention. Referring to FIG. 2, a multi-phase switching regulator 50 includes a multi-phase controller ("controller") 52 driving N parallel power stages 22. Each power stage 22 receives the input voltage Vin and is coupled to a respective output inductor L1 to LN. The output nodes of the output inductors L1 to LN are coupled to an output capacitor Cout to form the LC filter circuit to generate the regulated output voltage Vout (node 24) having a substantially constant magnitude. The output voltage Vout can then be used to drive a load 30 whereby switching regulator 50 provides the load current $I_{Load}$ to maintain the output voltage Vout at a constant level. In some examples, the power stage 22 is implemented as a pair of power switches connected in series between an input voltage Vin (node 58) and ground. The power switches can be N-type MOSFET devices or P-type and N-type MOSFET devices.

The multi-phase controller 52 implements feedback control of the power stages 22 to regulate the energy transfer to the LC filter circuit to maintain a constant output voltage within the desired load limits of the circuit. In particular, the multi-phase controller 52 receives a feedback voltage Vfb on a feedback node 26. The feedback voltage Vfb can be the regulated output voltage Vout or a divided down voltage of the regulated output voltage Vout. The multi-phase controller 52 generates the control signals, such as pulse-width-modulation (PWM) control signals PWM1 to PWMN, to cause the power switches in each power stage to turn on and off to regulate the output voltage Vout in relation to a reference voltage Vref.

More specifically, at the controller 52, the feedback voltage Vfb (node 26) is compared with the reference voltage Vref (node 53) at an error amplifier 54. The error amplifier 54 generates an error signal (node 55) being the difference between the feedback voltage Vfb and the reference voltage Vref. In some examples, the error signal may be digitized, such as by using an analog-to-digital converter (ADC). The error signal Verr, or a digitized version thereof, is provided to a loop calculator 56 to generate the PWM control signals PWM1 to PWM-N (node 19) for driving the power switches in the respective power stages 22. For example, the loop calculator 56 can include a proportional-integral-derivative (PID) calculator and a digital pulse-width-modulation (PWM) generator to generate the PWM control signals PWM1 to PWM-N (node 19) for driving the respective power stages 22. In response to the respective PWM control signal, the power switches in each power stage 22 turns on and off to regulate the energy transfer to the respective inductor L1 to LN and onto capacitor Cout. As a result, the controller 52 generates the PWM control signals for driving the power switches to regulate the regulated output voltage Vout to the desired voltage value as set by the reference voltage Vref. It is instructive to note that the construction of the switching regulator of FIG. 2 is illustrative only and not intended to be limiting. Other configuration of the switching regulator can be used. The construction of the switching regulator or the specific feedback control scheme used are not critical to the practice of the present invention.

Multi-phase controller 52 includes a memory 80 storing configuration parameters used in controlling the operation state of the switching regulator and the feedback control of the power stages 22. The loop calculator 56 is in communication with the memory 80 to obtain relevant configuration parameters during runtime. For example, the memory 80 may store configuration parameters 82 for the PID calculator in the loop calculator 56, such as the PID coefficients Ki, Kp and Kd. The PID coefficients may be used to adjust the gain bandwidth of the feedback control loop. The memory 80 may also store other configuration parameters for runtime operations. In the present embodiment, the controller 52 includes a communication interface 60 to receive input data Data_In (node 65) from an external source, such as the system processor or a user input. The communication interface 60 is in communication with the memory 80. The communication interface 60 can be used to load configuration parameter data into the memory 80. Alternately, the communication interface 60 can be used to update data values stored in the memory 80. In one embodiment, the communication interface is implemented as a power management bus (PMBus).

Furthermore, multi-phase controller 52 operates to select the number of phases, or the number of power stages, to activate in response to the load current demand. In embodiments of the present invention, the multi-phase controller 52 implements dynamic phase management (DPM) whereby a selected number of phases, or power stages, is activated based on the load current demand. A set of phase current thresholds is used to determine the specific number of power stages to activate for a given range of load current values. In the present embodiment, the set of phase current thresholds is stored in the memory 80. In some embodiments, the set of phase current thresholds is stored in a lookup table 84 in memory 80. The lookup table 84 stores the set of phase current thresholds where each phase current threshold is associated with a number of phases, or power stages, to be activated. The lookup table 84 is indexed by a current signal indicative of the load current supplying the load 30. For example, the loop calculator 56 receives a sense current Isens indicative of the load current $I_{Load}$ flowing into the load 30. The loop calculator 56 uses the sense current Isens to index the lookup table 84 to determine how many phases, or how many power stages, should be used for the given load current demand. In response to the sense current value, the lookup table 84 provides the loop calculator 56 a phase selection signal indicating the number of power stages to activate. In response to the phase selection signal, the loop calculator 56 generates the control signals to activate or deactivate the respective power stages.

In conventional switching regulator controllers, the lookup table stores pre-set phase current thresholds. The pre-set phase current thresholds cannot be changed during runtime of the switching regulator operation. Therefore, the conventional multi-phase switching regulator operates to change between different phases of operation based on fixed phase current thresholds, regardless of the power efficiency of any particular phase combinations. In embodiments of the present invention, the lookup table 84 stores a set of initial values for the phase current thresholds. The phase current thresholds are updated dynamically during runtime to maximize power efficiency, as will be explained in more detail below.

In embodiments of the present invention, to optimize power efficiency, the controller 52 includes logic circuits to measure the input and output power and to set the phase current thresholds accordingly to maximize the power efficiency. To that end, the controller 52 includes an input power (Pin) logic circuit 62 and an output power (Pout) logic circuit 64. The output power logic circuit 64 receives a first voltage signal Vo (node 59) indicative of the output voltage Vout and also receives a first current signal Io (node 61) indicative of the output current provided by the switching regulator 50 to the load 30 which is also the load current $I_{Load}$ flowing into the load. The first voltage signal Vo can be the output voltage Vout or can be a voltage related to the output voltage Vout. The first current signal Io can be sensed using various techniques. In one example, the first current signal Io can be measured as the sum of the output current supplied by each power stage. The first current signal Io can also be measured as the load current supplying the load. The first current signal Io can be the summed output currents of the power stages, or the load current flowing to the load, or a current value related thereto. In some embodiments, the first current signal Io can be the same current signal as the sense current signal Isens.

The input power logic circuit 62 receives a second voltage signal Vi (node 57) indicative of the input voltage Vin and also receives a second current signal Ii (node 59) indicative of the input current Iin flowing into the power stages 22 of the switching regulator 50. The second voltage signal Vi can be the input voltage Vin or can be a voltage related to the input voltage Vin. The second current signal Ii can be sensed using various techniques. In one example, the input current Iin is sensed at the input voltage node 58. The second current signal Ii can be measured as the input current Iin flowing into the power stages 22 or a current value indicative of the current flowing into the power stages 22.

The input power logic circuit 62 generates an input power signal Pin in response to the second voltage signal Vi and the second current signal Ii. For example, the input power signal Pin is the product of the input voltage Vin (as represented by the second voltage signal Vi) and the input current Iin (as represented by the second current signal Ii). The output power logic circuit 64 generates an output power signal Pout in response to the first voltage signal Vo and the first current signal Io. For example, the output power signal Pout is the product of the output voltage Vout (as represented by the first voltage signal Vo) and the output current Iout (as represented by the first current signal Io).

Multi-phase controller 52 further includes a control logic circuit 70 receiving the input power signal Pin and the output power signal Pout. The control logic circuit 70 calculates the power efficiency value using the input power signal Pin and the output power signal Pout. In one example, the power efficiency value is given as the ratio of the output power Pout to the input power Pin. That is, Peff =Pout/Pin. The power efficiency value can have a value from 0 to 1 or from 0 to 100%. Using the power efficiency value, the control logic circuit 70 evaluates the phase current thresholds to be used for different combinations of power stages. In the present description, different combination of power stages refers to different number of power stages being activated for use. In other words, the control logic circuit 70 set the phase current thresholds for the dynamic phase management operation dynamically based on the power efficiency value. The phase current thresholds are set to realize optimized power efficiency at different operating points of the switching regulator 50. In embodiments, the control logic circuit 70 is in communication with the memory 80 to modify the phase current threshold values in the lookup table 84.

The multi-phase switching regulator 50 implements dynamic phase management where a given number of power stages, or phases, is activated based on load current demand. Under dynamic phase management, the controller 52 receives the sense current signal Isens indicative of the load current $I_{Load}$ supplied to the load 30. The multi-phase controller 52 may be configured to control any number of power stages, from 2 to N power stages. Each power stage has an associated maximum current limit (e.g. 60 A) being the maximum current that can be handled by the output inductor associated with the power stage. The controller activates a given number of power stages to distribute the load current demand over one or more power stages so that each power stage operates within its own current limit. Under conventional dynamic phase management schemes, the controller is configured with a set of pre-set or fixed current thresholds for selecting different combination of phases in response to the load current demand. For example, for load current values lower than a first current threshold, the controller activates one power stage; for load current values equal to or greater than the first current threshold but lower than a second current threshold, the controller activates two power stages, and so on.

In embodiments of the present invention, the controller 52 is configured with initial values for the phase current thresholds used in the dynamic phase management operation. That is, the lookup table 84 stores initial values of phase current thresholds mapping to numbers of power stages to activate. The phase current thresholds are then modified or adjusted based on the power efficiency evaluation performed by the control logic circuit 70.

In one example, assuming each power stage 22 in switching regulator 50 has a maximum current limit of 60 A. The controller 52 is configured with initial phase current thresholds of up to 40 A for one power stage, up to 80 A for two power stages and up to 120 A for three power stages, and so on. During operation using the initial values, when the load current demand is less than 40 A, only one power stage is activated. When the load current demand increases to or exceeds 40 A, the first current threshold is reached and two power stages are activated. In the case the load current demand increases to 80 A or higher, the second current threshold is reached and three power stages are activated. On the other hand, in the case the load current demand decreases to 65 A, the switching regulator returns to activating two power stages. That is, the third power stage that was previously activated is now deactivated. In this manner, the controller 52 selectively turns on different number of power stages based on load current demand and using the phase current thresholds in the lookup table 84.

In embodiments of the present invention, during runtime of the switching regulator 50, the control logic circuit 70 receives the input power signal Pin and the output power signal Pout from the input power logic circuit 62 and the output power logic circuit 64. The control logic circuit 70 evaluates the power efficiency values for a given operating point, that is, the input/output voltage/current condition, and determines the optimal number of power stages for use with the given operating point.

In one example embodiment, the control logic circuit 70 determines a first power efficiency value for the present operating point, that is, the power efficiency value for present input/output voltage/current conditions and using a given number of activated power stages as indicated by the lookup table 84. The number of activated power stages can be selected based on the initial phase current threshold value or a previously modified phase current threshold value. The control logic circuit 70 then instructs the loop calculator 56 to increase the number of activated power stages by one, or if applicable and within the maximum current limit for the power stages, to decrease the number of activated power stages by one. With the modified number of power stages (either one more or one fewer), the control logic circuit 70 determines a second power efficiency value for the present operating point, that is, the power efficiency value for the present input/output voltage/current conditions and using the modified number of activated power stages (one more or one fewer).

In the event that the first power efficiency value is greater than the second power efficiency value, the control logic circuit 70 does not modify the lookup table 84 and allows the loop calculator to return to the original operating condition (using the original number of activated power stages). In the event that the first power efficiency value is less than the second power efficiency value, the control logic circuit modifies the lookup table 84 so that the loop calculator 56 uses the modified number of activated power stages (one more or one fewer) for the given operating condition. That is, the lookup table 84 is modified to use one more or one fewer power stages for the given load current condition. Alternate, the phase current threshold is modified so that for the given load current condition, one more or one fewer power stages are to be activated.

In one example, assuming the controller 52 is configured with initial phase current thresholds of up to 40 A for one power stage. In the event that the load current demand increases to 45 A, the controller 52 will activate two power stages based on the initial phase current threshold. However, the control logic circuit 70 evaluates the power efficiency values for the 45 A load current condition using the two power stages (original setting) and also using one fewer power stage (modified setting), that is, a single power stage. In the event that the power efficiency for using a single power stage is greater than the power efficiency for using two power stages, the control logic circuit 70 will modify the lookup table 84 to set the phase current threshold of up to 45 A for one power stage (instead of up to 40 A). In this case, the control logic circuit 70 evaluates the power usage conditions and determines that the switching regulator 50 can be operated with greater energy efficiency using a single power stage for up to 45 A of load current. The additional power stage does not need to be activated for load current up to 45 A, instead of activating the second power stage using the initial threshold value of 40 A.

In another example, assuming the controller 52 is configured with initial phase current thresholds of up to 80 A for two power stages. The present load current demand is 90 A and three power stages have been activated. In the event that the load current demand decreases to 75 A, the controller 52 will deactivate one power stage and activate only two power stages. However, the control logic circuit 70 evaluates the power efficiency values for the 75 A load current condition using the two power stages (original setting) and also using one additional power stage (modified setting), that is, three power stages. In the event that the power efficiency for using three power stages is greater than the power efficiency for using two power stages, the control logic circuit 70 will modify the lookup table 84 to set the phase current threshold of up to 74 A for two power stages. In that case, for a load current demand of 75 A, a third power stage will be activated. The control logic circuit 70 evaluates the power usage conditions and determines that the switching regulator 50 can be operated with greater energy efficiency using three power stages for 75 A of load current, instead of using two power stages until the initial phase current threshold of 80 A is met.

In this manner, the control logic circuit 70 operates to implement dynamic phase management by evaluating power efficiency levels of different combination of power stages for a given load current demand and selecting the phase combination, or the number of power stages, that maximizes power efficiency.

It is instructive to note that control logic circuit 70 modifies the phase current thresholds for different combinations of power stages while staying within the maximum current limit for the respective combination. For example, when a single power stage has a maximum current limit of 60 A, the control logic circuit 70 may modify the phase current threshold for a single power stage to up to 60 A and not exceeding 60 A. In some cases, a guard band region may be used. For example, when a single power stage has a maximum current limit of 60 A with a guard band of 5 A, the control logic circuit 70 may modify the phase current threshold for a single power stage to up to 55 A and not exceeding 55 A. The control logic circuit 70 modifies the phase current thresholds to optimize the power efficiency but remains within the maximum current limit of the power stages.

In one embodiment, the control logic circuit 70 is implemented as a micro-controller. The micro-controller can be a shared component of controller 52. That is, the controller 52 may include a micro-controller for providing other control and processing functions. The control logic circuit 70 is implemented using the same micro-controller. For example, the control logic circuit 70 can be implemented as new functionality in the existing micro-controller of the multi-phase switching regulator controller. No new circuit elements are required to implement the control logic circuit 70. In some embodiments, the input power logic circuit 62 and the output power logic circuit 64 can be implemented also as new functionality in the same micro-controller. In another embodiment, the control logic circuit 70 is implemented as a state machine. A state machine is preferred in cases where faster response is desired.

Figure 3:
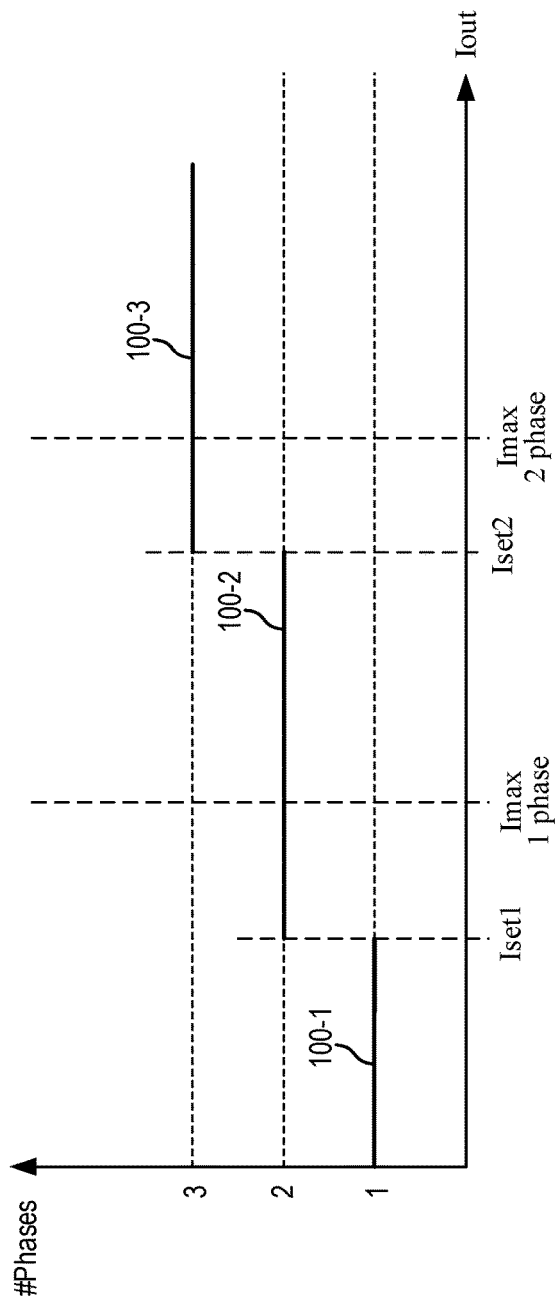
FIG. 3 illustrates the conventional dynamic phase management operation in a multi-phase switching regulator in some examples.

FIG. 3 illustrates the conventional dynamic phase management operation in a multi-phase switching regulator some examples. Referring to FIG. 3, under the conventional dynamic phase management scheme, the controller operates with fixed, pre-set phase current thresholds Iset1 and Iset2, each being lower than the maximum current limit for the associated phase combination. That is, the maximum current limit for using a single power stage is Imax (1 phase) and the maximum current limit for using two power stages is Imax (2 phase). The first phase current threshold Iset1 is set to be lower than Imax (1 phase) and the second phase current threshold Iset2 is set to be lower than Imax (2 phase). Accordingly, for load current demand less than the threshold Iset1, only a single power stage is activated (curve 100-1). For load current demand greater than the threshold Iset1 but less than the second phase current threshold Iset2, two power stages are activated (curve 100-2). For load current demand greater than the threshold Iset2, three power stages are activated (curve 100-3). Under the conventional scheme, the phase current thresholds Iset1 and Iset2 are fixed and cannot be changed.

Figure 4:
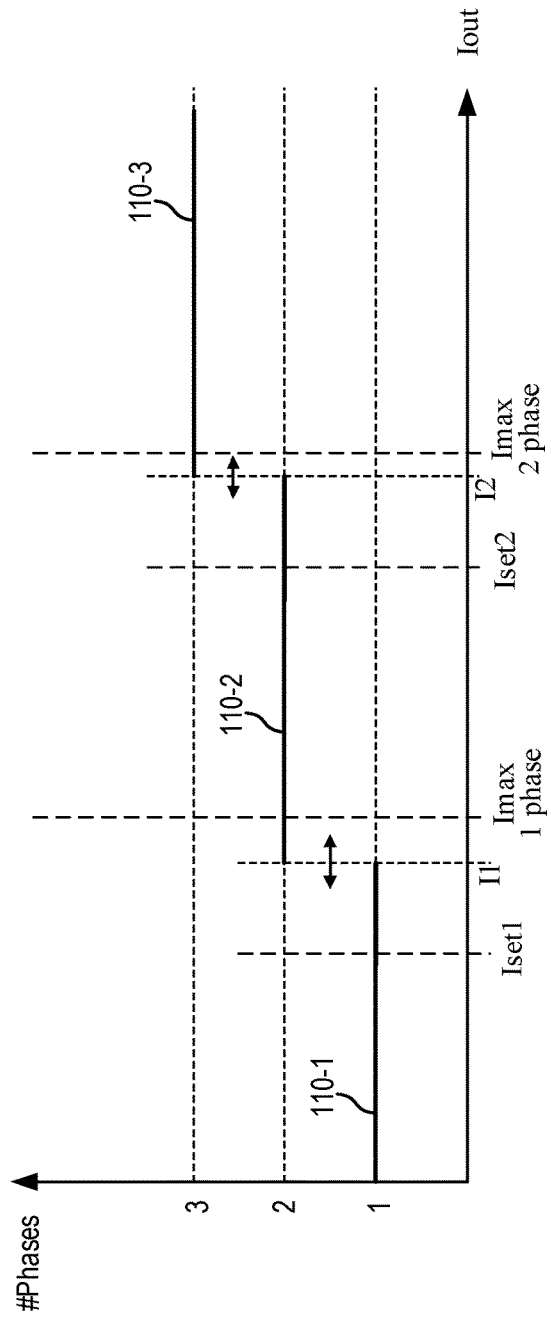
FIG. 4 illustrates the dynamic phase management operation in a multi-phase switching regulator according to embodiments of the present invention.

FIG. 4 illustrates the dynamic phase management operation in a multi-phase switching regulator according to embodiments of the present invention. Referring to FIG. 4, in accordance with embodiments of the present invention, the multi-phase controller implements dynamic phase management using adjustable phase current thresholds. Accordingly, the controller operates with initial phase current thresholds Iset1 and Iset2. However, the phase current thresholds can be modified based on power efficiency evaluations. In the present example, the first phase current threshold has been modified from the initial value of Iset1 to the threshold I1 and the second phase current threshold has been modified from the initial value of Iset2 to I2. The modified phase current thresholds remain within their respective maximum current limits Imax (1 phase) or Imax (2 phase). Accordingly, for load current demand less than the threshold I1, only a single power stage is activated (curve 110-1). Because the threshold I1 is greater than the threshold Iset1, the single power stage is used for a larger range of load current demand. That is, for power efficiency optimization, the single power stage can be used for load current greater than the initial threshold value.

For load current demand greater than the threshold I1 but less than the second phase current threshold I2, two power stages are activated. Similarly, because the threshold I2 is greater than the threshold Iset2, two power stages are used for a larger range of load current demand and higher load current values. That is, for power efficiency optimization, the two power stage combination can be used for load current greater than the initial threshold value. For load current demand greater than the threshold I2, three power stages are activated.

The controller of the present invention continues to evaluate the power efficiency of the switching regulator at operating points throughout the runtime of the switching regulator and the phase current thresholds can be continuously updated to optimize the energy usage.

Figure 5:
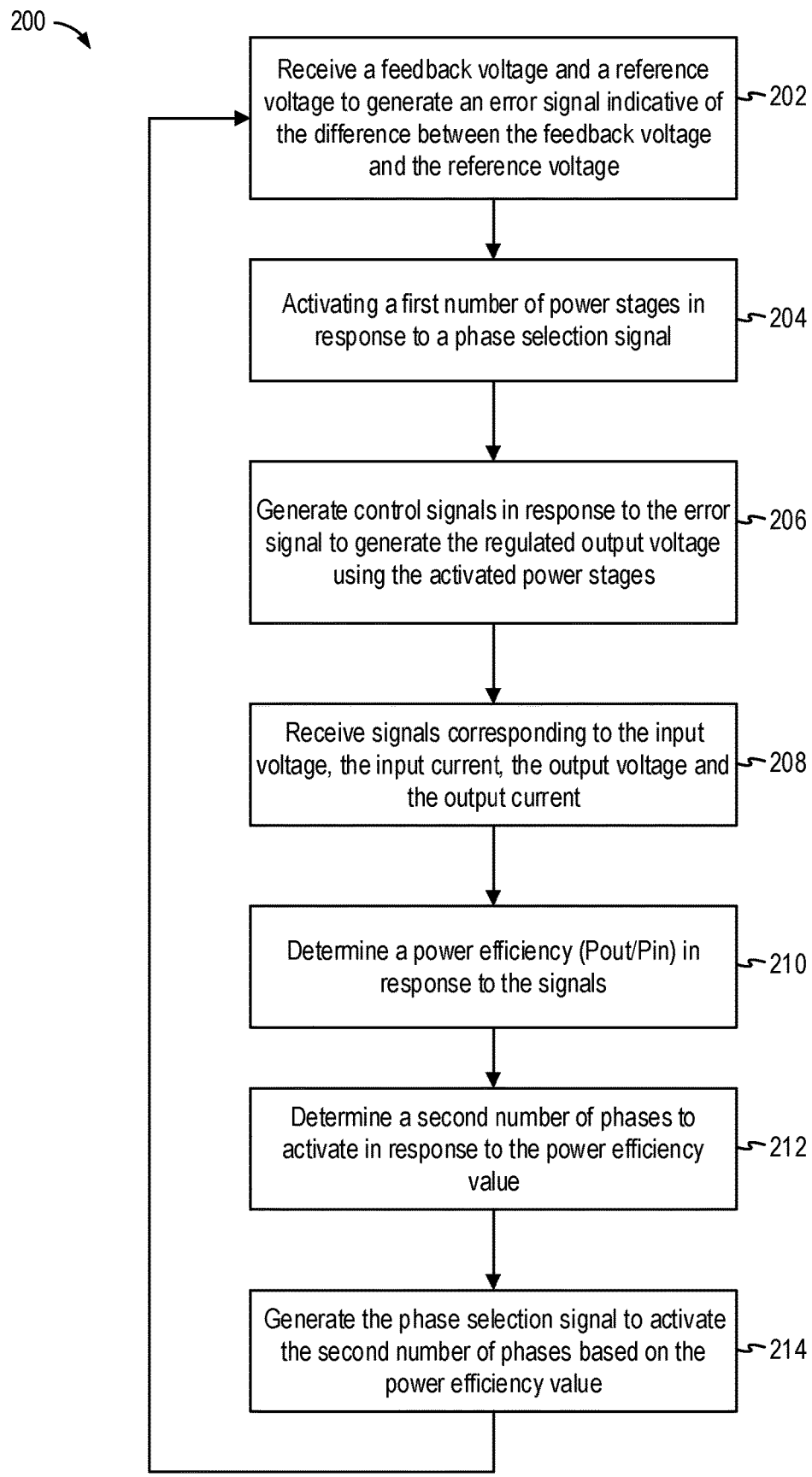
FIG. 5 is a flowchart illustrating a power efficiency optimization method in a multi-phase switching regulator implementing dynamic phase management in some embodiments.

FIG. 5 is a flowchart illustrating a power efficiency optimization method in a multi-phase switching regulator implementing dynamic phase management in some embodiments. Referring to FIG. 5, a method 200 starts by receiving a feedback voltage and a reference voltage to generate an error signal indicative of the difference between the feedback voltage and the reference voltage (202). The method 200 then activates a first number of power stages in response to a phase selection signal (204). The method 200 then generates control signals in response to the error signal to generate the regulated output voltage using the activated power stages (206). The method 200 receives signals corresponding to the input voltage, the input current, the output voltage and the output current (or load current) (208). The method 200 generates a power efficiency value being the ratio of the output power to the input power in response to the signals (210). The method 200 then determines a second number of phases to activate in response to the power efficiency value (212). The second number can be more or less than the first number. The method 200 then generates the phase selection signal to activate the second number of phases or power stages based on the power efficiency value (214).

In some embodiments, the method 200 determines the number of phases to activate in response to the power efficiency value and updates a lookup table storing phase current thresholds to number of power stages to activate. The method 200 generates the phase selection signal by indexing the lookup table using a sense current signal indicative of the load current to obtain the given number of power stages to activate.

Figure 6:
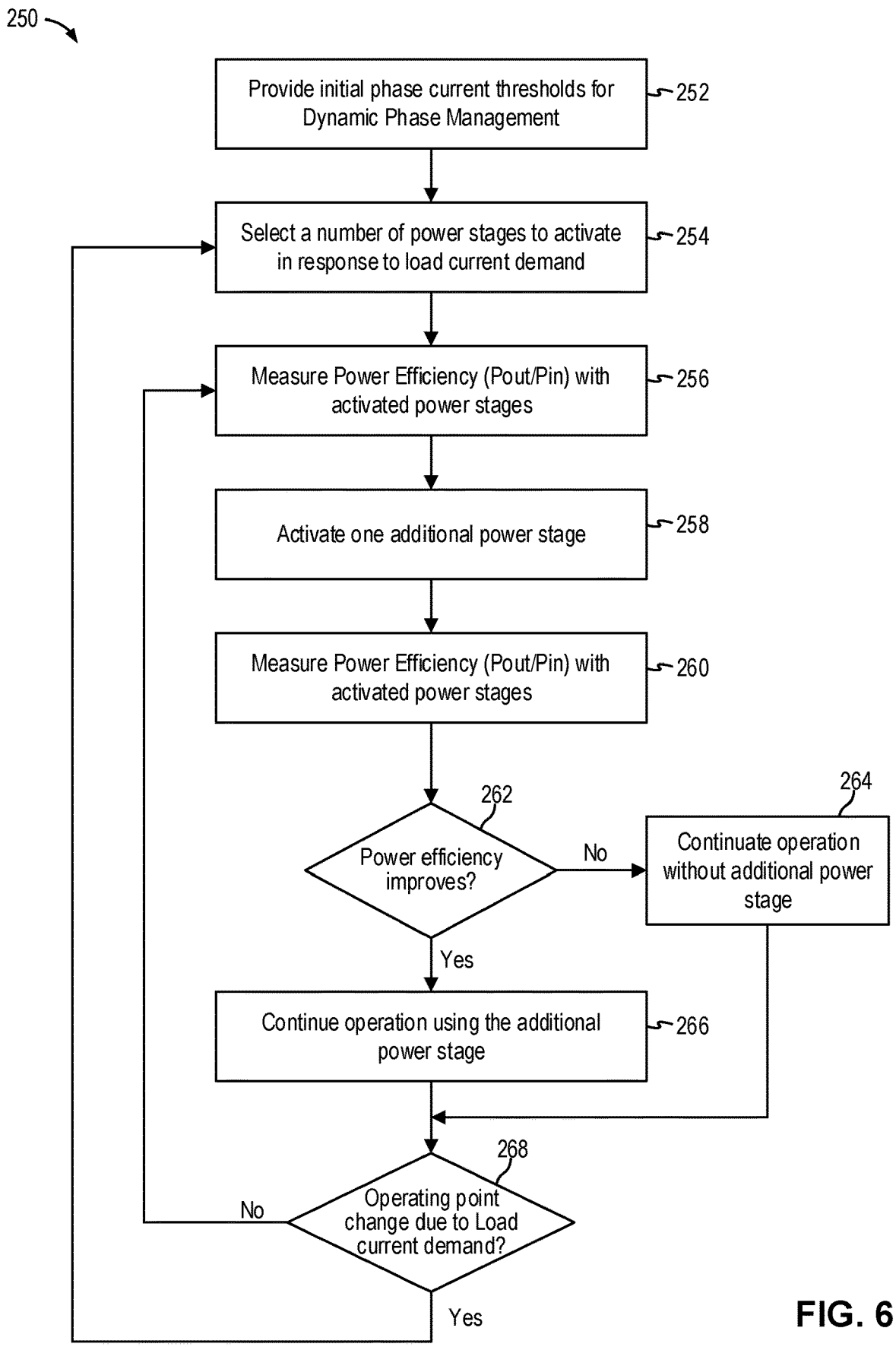
FIG. 6 is a flowchart illustrating a power efficiency optimization method in a multi-phase switching regulator implementing dynamic phase management in alternate embodiments.

FIG. 6 is a flowchart illustrating a power efficiency optimization method in a multi-phase switching regulator implementing dynamic phase management in alternate embodiments. Referring to FIG. 6, a method 250 starts by providing initial phase current thresholds for implementing dynamic phase management (252). The method 250 then select a number of power stages to activate in response to load current demand (254). The method 250 then measures a power efficiency value for the operating point using the number of activated power stages (256). The power efficiency value can be given as the ratio of the output power to the input power. The method 250 then activates one additional power stage (258). The method 250 then measures the power efficiency value using the activated power stages (260). That is, the power efficiency value for the activated power stages, including the additional power stage, is measured. The method 250 determines if the power efficiency has improved by activating the additional power stage (262). If the power efficiency has not improved, the method 250 then continue operation without the additional power stage (264). The method 250 continues to determine of the operating point has changed due to changes in load current demand (268). If the operating point has not changed, the method 250 repeats at 256 where the power efficiency value using the activated power stages is measured. If the operating point has changed, the method 250 returns to 254 to select a number of power stages to activate in response to load current demand.

If the power efficiency has improved with the addition of the power stage (262), the method 250 then continue operation using the additional power stage (266). The method 250 continues to determine of the operating point has changed due to changes in load current demand (268). If the operating point has not changed, the method 250 repeats at 256 where the power efficiency value using the activated power stages is measured. If the operating point has changed, the method 250 returns to 254 to select a number of power stages to activate in response to load current demand.

In some embodiments, the method 250 determines the number of phases to activate in response to the power efficiency value and updates a lookup table storing phase current thresholds to number of power stages to activate. The method 250 continues operation using the additional power stage by indexing the lookup table using a sense current signal indicative of the load current to obtain the given number of power stages to activate.

In method 250 of FIG. 6, an additional power stage is activated to evaluate the power efficiency values. In other embodiments, an number of activated power stage may be decreased by one to evaluate the power efficiency value. That is, one power stage may be deactivated to evaluate the power efficiency value.

The present disclosure can be implemented in numerous ways, including as a process; an apparatus; a system; a composition of matter; a computer program product embodied on a computer readable storage medium; and/or a processor, such as a hardware processor or a processor device configured to execute instructions stored on and/or provided by a memory coupled to the processor. In this specification, these implementations, or any other form that the present disclosure may take, may be referred to as techniques. In general, the order of the steps of disclosed processes may be altered within the scope of the present disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the present disclosure is provided above along with accompanying figures that illustrate the principles of the present disclosure. The present disclosure is described in connection with such embodiments, but the present disclosure is not limited to any embodiment. The scope of the present disclosure is limited only by the claims and the present disclosure encompasses numerous alternatives, modifications and equivalents. Numerous specific details are set forth in the following description in order to provide a thorough understanding of the present disclosure. These details are provided for the purpose of example and the present disclosure may be practiced according to the claims without some or all of these specific details. For the purpose of clarity, technical material that is known in the technical fields related to the present disclosure has not been described in detail so that the present disclosure is not unnecessarily obscured.

The above detailed descriptions are provided to illustrate specific embodiments of the present invention and are not intended to be limiting. Numerous modifications and variations within the scope of the present invention are possible. The present invention is defined by the appended claims.

What is claimed is:

1. A controller for a multi-phase switching regulator, the multi-phase switching regulator including a plurality of power stages connected in parallel to receive an input voltage and to generate a regulated output voltage on an output terminal for driving a load, the controller comprising:

an error amplifier configured to receive a feedback voltage indicative of the regulated output voltage and a reference voltage, and to generate an error signal indicative of the difference between the feedback voltage and the reference voltage;

a loop calculator configured to generate a plurality of control signals in response to the error signal, each control signal being coupled to drive a respective power stage, the power stages being driven by the control signals to generate the regulated output voltage having a voltage value related to the reference voltage; and a dynamic phase management control circuit configured to receive a first current signal indicative of a current flowing through the load, a first voltage signal indicative of the output voltage, a second current signal indicative of a current supplying the power stages and a second voltage signal indicative of the input voltage, and to generate a power efficiency value in response to the first current signal, the first voltage signal, the second current signal and the second voltage signal, the dynamic phase management control circuit being configured to provide a phase selection signal indicating a first number of power stages to be activated in response to the first current signal and the power efficiency value, the phase selection signal being provided to the loop calculator to activate the first number of power stages.

2. The controller of claim 1, wherein the dynamic phase management control circuit is configured to generate the power efficiency value as a ratio of an output power to an input power, the output power being related to the first voltage signal and the first current signal and the input power being related to the second voltage signal and the second current signal.

3. The controller of claim 1, wherein the dynamic phase management control circuit generates the phase selection signal selecting an initial number of power stages to activate in response to the first current signal and generates the phase selection signal to select the first number of power stages to activate in response to the power efficiency value, the first number of power stages being greater or less than the initial number.

4. The controller of claim 3, wherein the dynamic phase management control circuit generates the phase selection signal to select the first number of power stages for a given value of the first current signal within a maximum current limit associated with the selected number of power stages.

5. The controller of claim 1, wherein the dynamic phase management control circuit comprises a micro-controller configured to evaluate the power efficiency value and a memory storing a lookup table, the lookup table mapping phase current thresholds to numbers of power stages to be activated, the micro-controller being in communication with the memory to modify the phase current thresholds in the lookup table in response to the power efficiency value to optimize the power efficiency of the switching regulator for a given range of values of the first current signal.

6. The controller of claim 1, wherein the dynamic phase management control circuit comprises a state machine configured to evaluate the power efficiency value and a memory storing a lookup table, the lookup table mapping phase current thresholds to numbers of power stages to be activated, the state machine being in communication with the memory to modify the phase current thresholds in the lookup table in response to the power efficiency value to optimize the power efficiency of the switching regulator for a given range of values of the first current signal.

7. A method in a controller for a multi-phase switching regulator, the multi-phase switching regulator including a plurality of power stages connected in parallel to receive an input voltage and to generate a regulated output voltage on an output terminal for driving a load, the method comprising:
receiving a feedback voltage indicative of the regulated output voltage and a reference voltage;
generating an error signal indicative of the difference between the feedback voltage and the reference voltage;
generating a plurality of control signals in response to at least the error signal, each control signal being coupled to drive a respective power stage, the power stages being driven by the control signals to generate the regulated output voltage having a voltage value related to the reference voltage;
receiving a first current signal indicative of a current flowing through the load, a first voltage signal indicative of the output voltage, a second current signal indicative of a current supplying the power stages and a second voltage signal indicative of the input voltage;
generating a power efficiency value in response to the first current signal, the first voltage signal, the second current signal and the second voltage signal;
providing a phase selection signal indicating a first number of power stages to be activated in response to the first current signal and the power efficiency value;
activating the first number of power stages in response to the phase selection signal; and
generating the regulated output voltage based on the feedback voltage and the reference voltage using the activated power stages.

8. The method of claim 7, wherein generating the power efficiency value comprises:
generating the power efficiency value as a ratio of an output power to an input power, the output power being related to the first voltage signal and the first current signal and the input power being related to the second voltage signal and the second current signal.

9. The method of claim 7, wherein generating a phase selection signal comprises:
selecting the first number of power stages for a given value of the first current signal within a maximum current limit associated with the selected number of power stages.

10. The method of claim 7, wherein generating a phase selection signal comprises:
generating the phase selection signal selecting an initial number of power stages to activate in response to the first current signal; and
generating the phase selection signal to select the first number of power stages to activate in response to the power efficiency value, the first number of power stages being greater or less than the initial number.

11. The method of claim 7, wherein generating a phase selection signal comprises:
generating the phase selection signal to select an initial number of power stages to activate in response to the first current signal;
measuring a first power efficiency value for the initial number of activated power stages;
generating the phase selection signal to select one additional power stage to activate;
measuring a second power efficiency value for the initial number plus one additional activated power stages;
in response to the second power efficiency being less than the first power efficiency, generating the phase selection signal to select the initial number of power stages to activate; and
in response to the second power efficiency being greater than the first power efficiency, generating the phase selection signal to select the initial number plus one additional power stages to activate.

12. The method of claim 7, wherein generating a phase selection signal comprises:
generating the phase selection signal to select an initial number of power stages to activate in response to the first current signal;
measuring a first power efficiency value for the initial number of activated power stages;
generating the phase selection signal to select one fewer power stage to activate;
measuring a second power efficiency value for the initial number minus one activated power stages;
in response to the second power efficiency being less than the first power efficiency, generating the phase selection signal to select the initial number of power stages to activate; and
in response to the second power efficiency being greater than the first power efficiency, generating the phase selection signal to select the initial number minus one power stages to activate.

13. The method of claim 7, wherein generating a power efficiency value comprises:
generating a power efficiency value using a micro-controller.

14. The method of claim 7, wherein generating a power efficiency value comprises:
generating a power efficiency value using a state machine.

15. The method of claim 7, wherein generating a phase selection signal comprises:
providing a memory storing a lookup table, the lookup table mapping phase current thresholds to numbers of power stages to be activated;
modifying the phase current thresholds in the lookup table in response to the power efficiency value to optimize the power efficiency of the switching regulator for a given range of values of the first current signal; and
indexing the lookup table using the first current signal to obtain the number of power stages to activate as the phase selection signal.

* * * * *